United States Patent Office 2,837,571
Patented June 3, 1958

2,837,571
2-ACYLINDANONES AND PROCESS FOR THEIR PREPARATION

Lloyd H. Conover, New London, Conn., assignor to Chas. Pfizer & Co., Inc., Brooklyn, N. Y., a corporation of Delaware No Drawing. Application August 12, 1953
Serial No. 373,903

6 Claims. (Cl. 260—592)

This invention is concerned with a process for the preparation of acylated indanones and with the novel products produced by this process.

Various compounds have been suggested as chelating or sequestering agents for the formation of complexes with polyvalent metals. The chelating agents have a number of uses such as the removal of traces of metals which function to accelerate decomposition of various compounds. The compounds effective as sequestrants include hydroxy acids, hydroxy ketones, poly alcohols, and other compounds of this nature. These compounds have various deficiencies and the availability of improved materials which form stable, highly solvent-soluble complexes or chelates with polyvalent metallic compounds is of definite value.

It has now been found that certain oxygenated, acylated indanones are highly useful as chelating agents. These compounds are prepared by the acylation at the 2-position of indanones substituted in the aromatic ring with oxygenated substituents but unsubstituted in the 2-position. The following formulas indicate the process of this invention and the novel acylated indanone products:

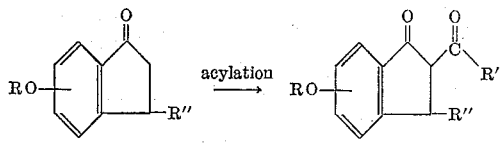

R is chosen from the group hydrogen, alkyl, aryl, aralkyl, and acyl, R' is lower alkyl group, or a substituted lower alkyl group, for instance a group bearing an hydroxyl; R'' is chosen from the group hydrogen and methyl. When the group R is hydrogen the compounds are particularly effective chelating agents.

The process of this invention is conducted by contacting an aromatic ring-oxygenated indanone with an acylating agent in the presence of a suitable condensing agent. The reaction is preferably conducted under anhydrous conditions in a stable organic solvent which does not undergo condensation under the conditions of the reaction. Alternatively, a large excess of the acylating agent may be used in place of the solvent or in place of part of the solvent. Normally, approximately one molecular proportion of the acylating agent is required per molecular proportion of the indanone in order to achieve a reasonable yield of the acylated product. The preferred method for conducting the preparation of the acylated indanones is to contact the unacylated indanone with an ester of a carboxylic acid, the acyl radical of which it is desired to introduce into the indanone ring system. This reaction is conducted in the presence of an anhydrous strongly alkaline condensing agent. Materials which are suitable include alkali metals, e. g. sodium or potassium, an alkali metal amide, such as sodamide, or other similar alkaline condensing agents, such as sodium triphenylmethyl, sodium lower alkoxide, and so forth. The condensation reaction takes place to the greatest extent at the 2-position of the indanone ring system, that is, adjacent to the keto group of the ring.

The oxygenated substituent on the aromatic ring of the indanone system may consist of an hydroxyl group or a lower alkoxy group, for example, methoxyl, ethoxyl, butoxyl, and so forth. By lower alkyl and lower alkoxy groups we mean those having up to about five carbon atoms in their principal chain. The oxygenated group may consist of an arylalkoxy radical such as benzyloxy, paramethyl benzyloxy, and so forth. The oxygenated substituent may also be an aryloxy group such as phenoxy, toluyloxy, etc., or an acyloxy group may be used in the aromatic ring of the indanone compound. This may consist of an ester of an aliphatic, aromatic or an aryl aliphatic acid. Groups such as acetoxy, propionoxy, or the benzoic, phenylacetic, butyric, and other acid esters of this type may be used. The oxygenated substituent of the aromatic ring of the indanone may occur at any one or more of the four unsubstituted positions of the aromatic ring. Compounds oxygenated at the 7-position are particularly useful.

The oxygenated indanone compounds used as starting materials in the acylation reactions may be prepared, for instance, by cyclization of a phenyl ester of an α-halogenated lower aliphatic acid by a known process (K. V. Auwers and E. Hillinger, Berichte, vol. 49, p. 2410 (1916)). For instance, if phenyl α-bromopropionate is heated with aluminum chloride, there is formed 5-hydroxyindanone. When phenyl α-bromobutyrate is treated in the same manner, a mixture of 5- and 7-hydroxy-3-methylindanone is formed. These may be separated and used in the reactions of this invention or the mixture may be used. The phenolic hydroxyl group of the indanones may be esterified or etherified by standard procedures.

A variety of ester acylating agents may be used for the preparation of the novel compounds of this invention. These include, in particular, aliphatic, aromatic and aryl aliphatic alcohol esters of the desired lower aliphatic acids and substituted lower aliphatic acids. It has been found that aromatic esters of the lower aliphatic acids are particularly good acylating agents. An example of such a compound is phenyl acetate. Others are esters of acetic, propionic, butyric, valeric, phenylacetic, phenylpropionic, and cyclohexylacetic with alcohols such as methanol, ethanol, propanol, benzyl alcohol, phenol, and so forth.

The reactions of this invention may be conducted at room temperature or at a somewhat elevated temperature up to about 50° C. In general the condensation is completed within a few hours, although the mixtures may be agitated for a longer period to assure a maximum yield of the product. The products are isolated by quenching the mixture with water and/or ice. The mixture is acidified and the product is isolated. Purification may be accomplished by extraction with a water-immiscible solvent and distillation of the extracting solvent and fractionation of the product if desired. The products are generally light colored or white crystalline materials possessing characteristic melting points and absorption spectra. In some cases colorless liquids are obtained.

A particularly useful method of isolating and purifying the products of this invention, particularly those hydroxylated in the aromatic ring, is by formation of a solid chelate with a polyvalent metal. The formation of these complexes may readily be accomplished by contacting the indanone and a metallic salt in a solvent. Lower aliphatic alcohols are especially useful for this purpose. Although a variety of polyvalent metals are useful, the iron group of metals (iron, nickel, cobalt) and copper are particularly valuable. The salt of the metal should have appreciable solubility in the chosen solvent.

Halides and lower aliphatic acid salts are quite useful. The complexes separate as solids, often crystalline, and may be recrystallized. Treatment with dilute aqueous acid and extraction with a water-immiscible solvent results in the recovery of the purified product. The metallic complexes are useful themselves. For instance, copper and zinc complexes are fungicidal, and act as preservatives. Other complexes, e. g. the cobalt compounds, act as catalysts, for instance in paint driers.

The novel products of this invention readily form metallic complexes when contacted under suitable conditions with polyvalent metallic salts. This reaction occurs in aqueous solution and the metallic complexes are highly soluble in organic solvents so they may be recovered from water by extraction. Alternatively, the complexes may be formed in suitable organic solvents such as lower alcohols.

The following examples are given by way of illustration and are not to be considered as the only manner in which this invention may be embodied. It is to be understood that protection hereof is only to be limited by the specific wording of the appended claims.

EXAMPLE I

*Preparation of 2-acetyl-7-methoxy-3-methylindanone*

To a stirred suspension of sodamide (prepared from 10.4 g. of sodium) in 500 ml. of anhydrous ether there was added dropwise a solution of 40 g. of 7-methoxy-3-methylindanone in 50 ml. of ether. When the refluxing caused by the resulting exothermic reaction had subsided there was added 31 g. of phenyl acetate in 50 ml. of ether. This dropwise addition also caused refluxing to occur. After the mixture was stirred for eighteen hours at room temperature and refluxed for one hour, it was poured into 100 g. of ice and acidified with 18% hydrochloric acid. Ether extraction and evaporation of the dried extracts gave an oil. The oil was distilled to obtain some phenol, starting material, and 17.3 g. of the desired product. This latter material boiled at 155° C. under a pressure of 0.1 mm. of mercury. The product gives a deep purple test with ferric chloride solution. It crystallized on standing a short time and was recrystallized from ethanol. It may also be recrystallized from a mixture of ethanol and water or from acetone. The indanone melts at 89–90° C. It displays ultraviolet absorption peaks at 262 and 333 m$\mu$ when dissolved in 0.01 molar methanolic hydrogen chloride. In 0.01 molar methanolic sodium hydroxide peaks occur at 248, 259, 265 and 350 m$\mu$. When the acylated indanone is dissolved in methanol which is 0.01 molar in magnesium chloride hexahydrate the resulting complex displays maxima at 247, 357, 265 and 352 m$\mu$. The product was analyzed and found to have the following carbon and hydrogen content.

*Analysis.*—Calcd. for: $C_{13}H_{14}O_3$: C, 71.54; H, 6.39. Found: C, 71.57; H, 6.40.

The molecular weight calculated for this product is 218. The molecular weight found by determination of the neutralization equivalent is 217.

EXAMPLE II

*Preparation of 2-acetyl-7-hydroxy-3 methylindanone*

A mixture of 5.0 grams of 7-hydroxy-3-methylindanone and ethyl acetate (20 ml.) was stirred under nitrogen while 1.7 grams of freshly cut sodium was added. Heat was applied after the initial exothermic reaction had subsided (about one hour) and the mixture was refluxed for four hours. The reaction mixture was then acidified with ice and 5% glacial acetic acid, extracted with ether and the ether washed with saturated sodium bicarbonate solution. The ether solution was dried and evaporated and the residue (which contained a large amount of ethyl acetate) was treated with saturated methanolic cupric acetate. In this way was obtained 3.8 grams of green crystalline copper complex. The latter was recrystallized from benzene-chloroform. It had a melting point of 195–197° C.

*Analysis.*—Calcd. for $C_{38}H_{34}O_6Cu$: C, 70.2; H, 5.3; Cu, 9.8. Found: C, 70.5; H, 5.3; Cu, 10.0.

A sample (2.2 grams) of the complex was treated with 5% sulfuric acid and the $\beta$-diketone was taken up in ether. Evaporation of the ether gave 1.2 grams of crystalline material (melting point 78–79°) which could be recrystallized from ethanol-water or distilled at 125°, 0.1 mm.

*Analysis.*—Calcd. for $C_{12}H_{12}O_3$: C, 70.6; H, 5.9. Found: C, 70.9; H, 6.0.

The molecular weight calculated for this product is 204. The molecular weight found by determination of the neutralization equivalent is 198.

What is claimed is:

1. A process of producing a compound of the formula:

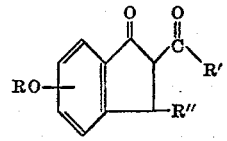

wherein R is selected from the group consisting of hydrogen and lower alkyl, R' is selected from the group consisting of lower alkyl and hydroxy-substituted lower alkyl and R'' is selected from the group consisting of hydrogen and methyl which comprises reacting a compound of the formula:

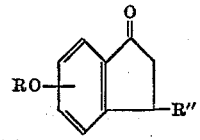

with an acylating agent which is an ester of an acid of the formula R'COOH in the presence of an alkaline condensing agent under anhydrous conditions.

2. A process as claimed in claim 1 wherein a 7-lower alkoxy-3-methylindanone is contacted with an ester of a lower aliphatic acid in the presence of a strongly alkaline condensing agent under anhydrous conditions.

3. A process as claimed in claim 1 wherein 7-methoxy-3-methylindanone is contacted with phenyl acetate in the presence of sodamide under anhydrous conditions.

4. A compound having the structure

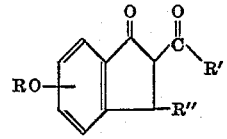

wherein R is selected from the group consisting of hydrogen and lower alkyl, R' is selected from the group consisting of lower alkyl and hydroxy substituted lower alkyl, and R'' is selected from the group consisting of hydrogen and methyl.

5. 2-acetyl-7-methoxy-3-methylindanone.
6. 2-acetyl-7-hydroxy-3-methylindanone.

References Cited in the file of this patent

UNITED STATES PATENTS 2,158,071     Hansley _____ May 16, 1939

FOREIGN PATENTS 710,718     Germany _____ Sept. 19, 1941

OTHER REFERENCES

Johnson et al.: J. Am. Chem. Soc., vol. 66, pp. 218–222 (1944).

Johnson et al.: J. Am. Chem. Soc., vol. 67, pp. 1745–6, 1751–2 (1945).

Chem. Abstr., vol. 42, p. 6791(*b*), 1948.

Hauser et al.: J. Am. Chem. Soc., vol. 69, pp. 2649–2651 (1947).